US008437605B2

(12) United States Patent
Cho et al.

(10) Patent No.: US 8,437,605 B2
(45) Date of Patent: *May 7, 2013

(54) RECORDING MEDIUM CONTAINING MOVING PICTURE DATA AND ADDITIONAL INFORMATION THEREOF AND REPRODUCING METHOD AND APPARATUS OF THE RECORDING MEDIUM

(75) Inventors: Jang Hui Cho, Seoul (KR); Jea Yong Yoo, Seoul (KR); Sung Wan Park, Suwon-si (KR); Mi Hyun Kim, Seoul (KR); Kang Soo Seo, Kyunggi-do (KR); Soung Hyun Um, Kyunggi-do (KR); Byung Jin Kim, Kyunggi-do (KR)

(73) Assignee: LG Electronics Inc, Seoul (KR)

( * ) Notice: Subject to any disclaimer, the term of this patent is extended or adjusted under 35 U.S.C. 154(b) by 531 days.

This patent is subject to a terminal disclaimer.

(21) Appl. No.: 12/659,511

(22) Filed: Mar. 11, 2010

(65) Prior Publication Data

US 2010/0209076 A1 Aug. 19, 2010

Related U.S. Application Data

(63) Continuation of application No. 12/318,093, filed on Dec. 22, 2008, now Pat. No. 8,073,305, which is a continuation of application No. 10/143,499, filed on May 10, 2002, now Pat. No. 7,646,965.

(30) Foreign Application Priority Data

May 12, 2001 (KR) .................. 10-2001-0026026

(51) Int. Cl.
*H04N 9/80* (2006.01)
*H04N 5/93* (2006.01)
(52) U.S. Cl.
USPC ......................................... 386/240; 386/353

(58) Field of Classification Search .................. None
See application file for complete search history.

(56) References Cited

U.S. PATENT DOCUMENTS

| 4,825,403 A | 4/1989 | Gershenson et al. |
| 5,715,355 A | 2/1998 | Yonemitsu et al. |

(Continued)

FOREIGN PATENT DOCUMENTS

| EP | 0 762 422 | 3/1997 |
| JP | 10-154380 | 6/1998 |

(Continued)

OTHER PUBLICATIONS

Office Action for Korean Application No. 10-2001-0026026 dated Feb. 14, 2007.

(Continued)

*Primary Examiner* — Gelek W Topgyal
(74) *Attorney, Agent, or Firm* — Harness, Dickey & Pierce, P.L.C.

(57) ABSTRACT

The present invention relates to a recording medium containing moving picture data and additional information thereof and to reproducing method and apparatus of the recording medium. The present recording medium has script files including additional information about moving picture data, e.g., scene descriptive text and introduction of characters, etc. In addition, information linking each script file with a section of moving picture data to be presented with contents of the script file is included in a link data file or is contained in a filename of the script file. In reproduction of the recording medium, a script file linked with presently reproduced moving picture data section is determined and searched for based on the link data file or every filename of the script files, and contents of the found script file are presented together with the presently reproduced moving picture data. Furthermore, previously presented additional information is removed depending on data or filename of the found script file.

10 Claims, 11 Drawing Sheets

U.S. PATENT DOCUMENTS

| | | |
|---|---|---|
| 5,771,334 A | 6/1998 | Yamauchi et al. |
| 5,909,551 A | 6/1999 | Tahara et al. |
| 5,915,067 A | 6/1999 | Nonomura et al. |
| 5,970,511 A | 10/1999 | Kurita et al. |
| 6,070,167 A | 5/2000 | Qian et al. |
| 6,438,317 B1 | 8/2002 | Imahashi et al. |
| 6,487,366 B1 | 11/2002 | Morimoto et al. |
| 6,553,180 B1 | 4/2003 | Kikuchi et al. |
| 6,580,870 B1 | 6/2003 | Kanazawa et al. |
| 6,701,064 B1 | 3/2004 | De Haan et al. |
| 6,795,973 B1 | 9/2004 | Estipona |
| 6,798,447 B1 | 9/2004 | Katsuki |
| 6,904,229 B1 | 6/2005 | Suzuki et al. |
| 6,961,512 B1 | 11/2005 | Cho |
| 7,099,557 B1 | 8/2006 | Morotomi et al. |
| 2001/0006771 A1 | 7/2001 | Kajiyama et al. |
| 2002/0181939 A1 | 12/2002 | Date et al. |
| 2003/0086690 A1 | 5/2003 | Chung et al. |
| 2003/0151994 A1 | 8/2003 | Tasaka et al. |

FOREIGN PATENT DOCUMENTS

| | | |
|---|---|---|
| JP | 11-205727 | 7/1999 |
| JP | 2000-207874 | 7/2000 |
| JP | 2001-014838 | 1/2001 |
| KR | 10-2000-0013758 | 3/2000 |
| WO | WO 00/36600 | 6/2000 |

OTHER PUBLICATIONS

Office Action for Japanese Application No. 02-136552 dated Aug. 28, 2007.

Office Action for Japanese Application No. 02-136554 dated Sep. 18, 2007.

Search Report for European Application No. 02010686.0 dated Nov. 26, 2007.

Search Report for corresponding European Application No. 08019395.6 dated May 4, 2009.

Search Report for corresponding European Application No. 09002963.8 dated May 4, 2009.

FIG. 3
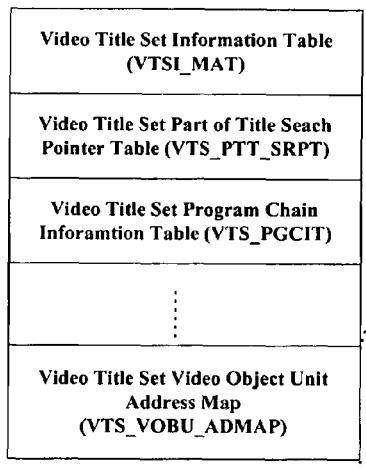
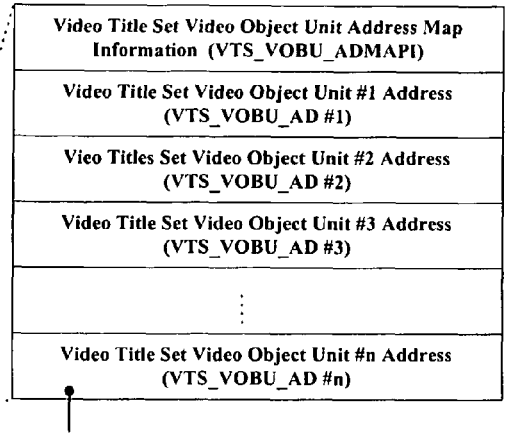
Start address of VTS_VOBU for VOBU #n
FIG. 4
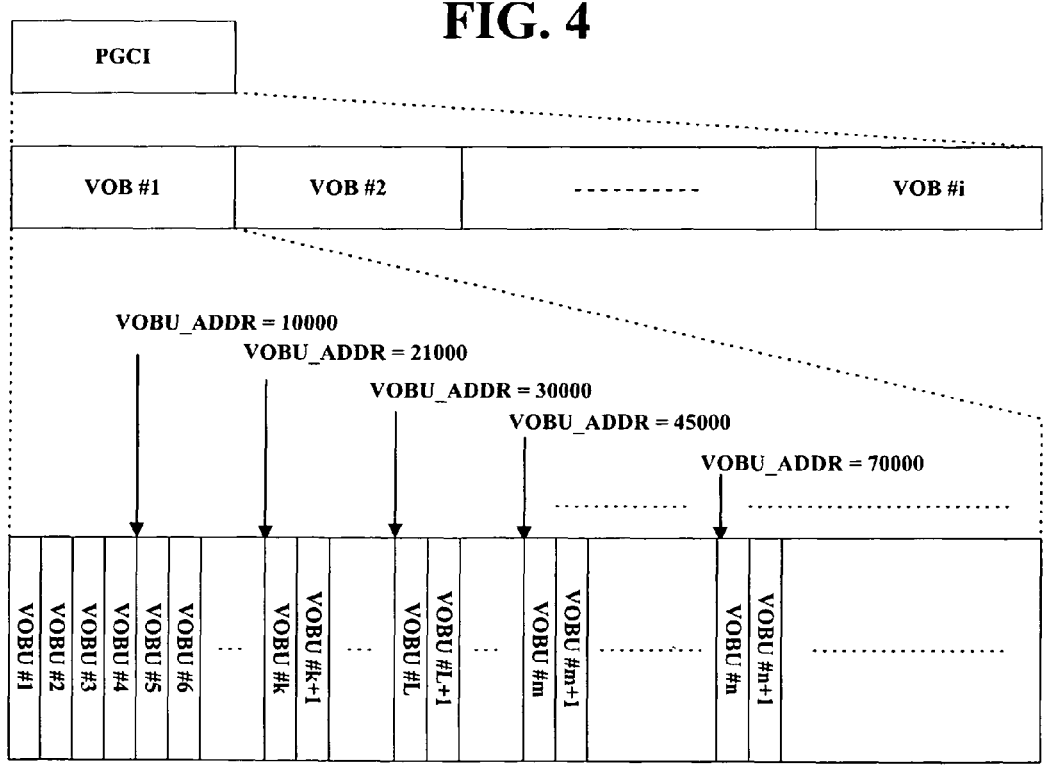

FIG. 5

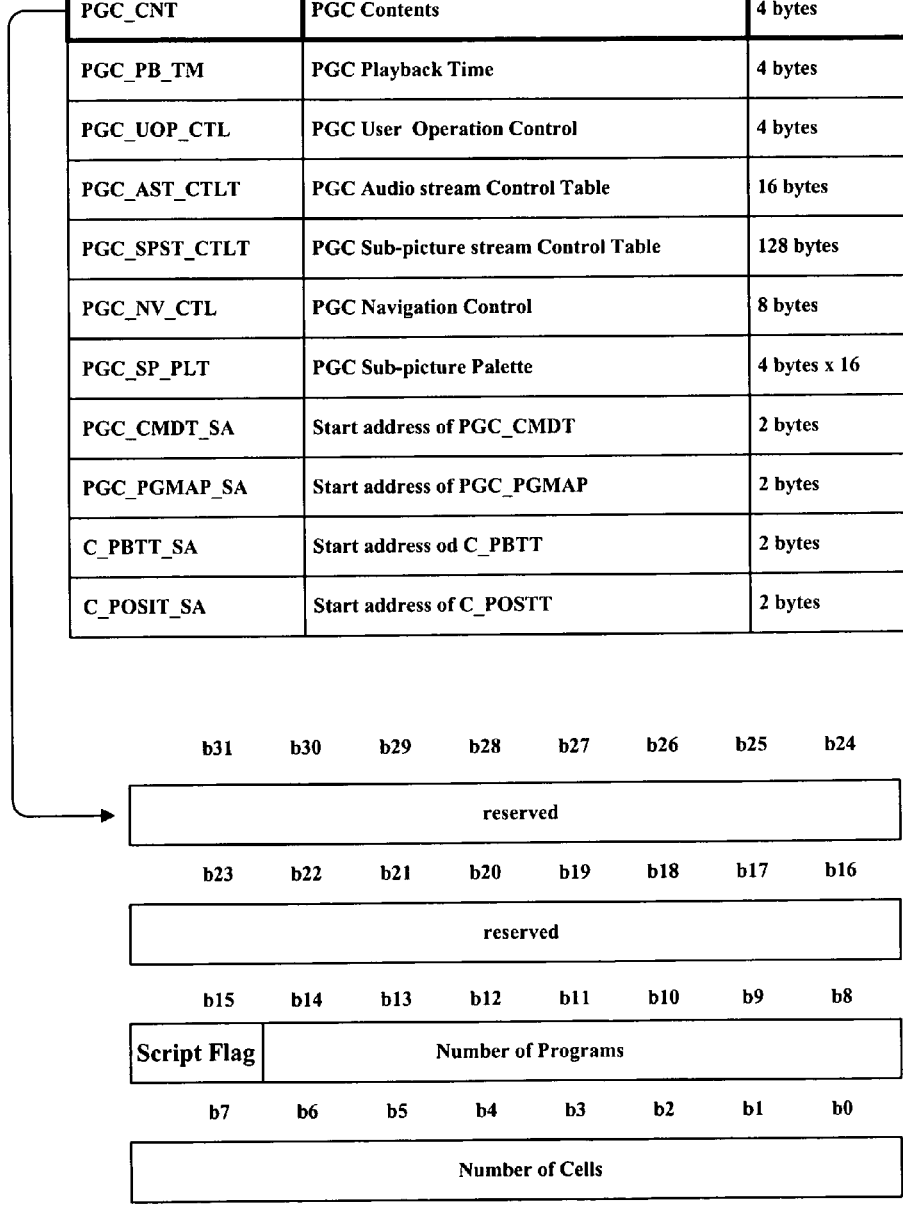

PGC_GI

| Field | Contents | Number of bytes |
|---|---|---|
| PGC_CNT | PGC Contents | 4 bytes |
| PGC_PB_TM | PGC Playback Time | 4 bytes |
| PGC_UOP_CTL | PGC User Operation Control | 4 bytes |
| PGC_AST_CTLT | PGC Audio stream Control Table | 16 bytes |
| PGC_SPST_CTLT | PGC Sub-picture stream Control Table | 128 bytes |
| PGC_NV_CTL | PGC Navigation Control | 8 bytes |
| PGC_SP_PLT | PGC Sub-picture Palette | 4 bytes x 16 |
| PGC_CMDT_SA | Start address of PGC_CMDT | 2 bytes |
| PGC_PGMAP_SA | Start address of PGC_PGMAP | 2 bytes |
| C_PBTT_SA | Start address od C_PBTT | 2 bytes |
| C_POSIT_SA | Start address of C_POSTT | 2 bytes |

| b31 | b30 | b29 | b28 | b27 | b26 | b25 | b24 |
|---|---|---|---|---|---|---|---|
| reserved ||||||||

| b23 | b22 | b21 | b20 | b19 | b18 | b17 | b16 |
|---|---|---|---|---|---|---|---|
| reserved ||||||||

| b15 | b14 | b13 | b12 | b11 | b10 | b9 | b8 |
|---|---|---|---|---|---|---|---|
| Script Flag | Number of Programs |||||||

| b7 | b6 | b5 | b4 | b3 | b2 | b1 | b0 |
|---|---|---|---|---|---|---|---|
| Number of Cells ||||||||

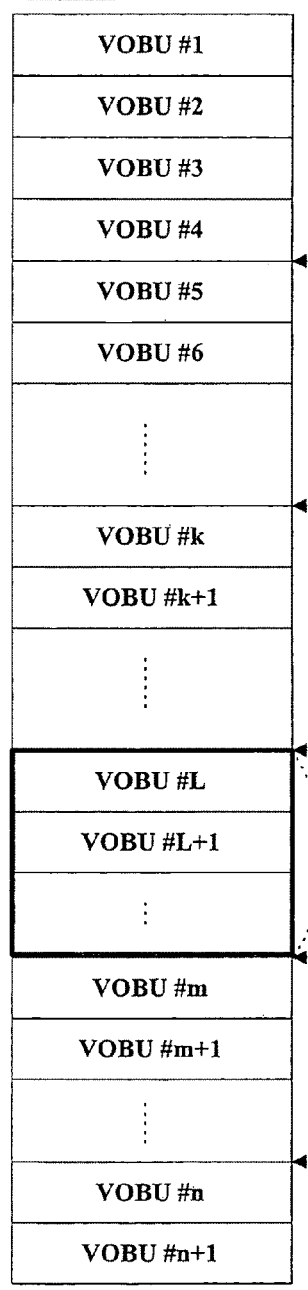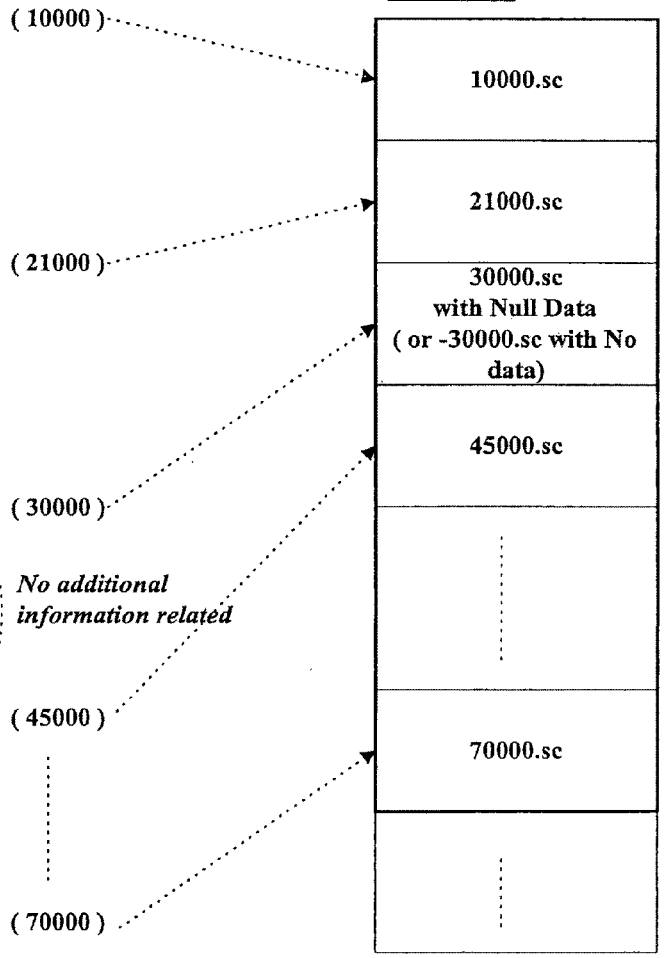
FIG. 9

US 8,437,605 B2

RECORDING MEDIUM CONTAINING MOVING PICTURE DATA AND ADDITIONAL INFORMATION THEREOF AND REPRODUCING METHOD AND APPARATUS OF THE RECORDING MEDIUM

PRIORITY

This is a continuation of, and claims priority under 35 U.S.C. §120 to, U.S. application Ser. No. 12/318,093, filed Dec. 22, 2008 now U.S. Pat. No. 8,073,305, which is a continuation of U.S. application Ser. No. 10/143,499, filed May 10, 2002 now U.S. Pat. No. 7,646,965, which claims priority to Korean Application No. 10-2001-26026, filed May 12, 2001; the entire contents of all these applications are hereby incorporated by reference.

BACKGROUND OF THE INVENTION

1. Field of the Invention

The present invention relates to a recording medium on which moving picture data have been recorded together with script files including additional information related with the moving picture data.

The present invention further relates to a method of linking script files with moving picture data and relates to method and apparatus of reproducing the moving picture data along with script files thereof.

2. Description of the Related Art

An optical disk such as DVD (Digital Versatile Disk) being able to store digital data is widely used in these days. A DVD can store not only audio data but also moving picture data of long time. A DVD has two recording partitions, one for storing digital data stream such as moving picture data, and the other for storing navigation data which are used to control reproduction of the stored digital data stream.

Thus, when a DVD having digital data stream thereon is placed into a conventional DVD player, the player reads out the reproduction-controlling data written in the navigation data partition first and stores them in a memory equipped therein. Afterwards, the DVD player can select or search for an arbitrary section of moving picture data using the reproduction-controlling data in the memory and playback it.

A DVD may include additional information about moving picture data recorded thereon. Namely, a DVD may include scene descriptive texts and introduction of characters, etc. besides video and audio data. Such additional information may be informed to a viewer who wants more information about moving pictures being presented.

However, how to link such additional information with moving picture data and how to reproduce it along with moving picture data are not yet decided.

SUMMARY OF THE INVENTION

It is an object of the present invention to provide a method of linking additional information with each section of moving picture data and of storing the additional information.

It is another object of the present invention to provide method and apparatus of reproducing a recording medium including the additional information as well as moving picture data thereon.

A recording medium in accordance with the present invention is characterized in that it has data comprising: moving picture data; additional information, written in the form of file, related with said moving picture data; and link information linking said at least one link information file with said moving picture data.

A method of reproducing a recording medium containing moving picture data and additional information thereof in accordance with the present invention is characterized in that it comprises the steps of: determining whether there is at least one file including additional information for moving picture data on a recording medium; selecting a piece of link information linking said at least one link information file with at least one section of moving picture data based on the determination result, reading the selected piece of link information from the recording medium, and storing the read piece of link information into storage means other than the recording medium; and searching for an additional information file linked with presently reproduced moving picture data with reference to the stored piece of link information, and outputting contents of the found additional information file together with moving picture data.

An apparatus of reproducing a recording medium containing moving picture data and additional information thereof in accordance with the present invention is characterized in that it comprises: a data pickup reading data recorded on a recording medium; a data storage for storing a piece of link information, read by said data pickup, linking at least one file, which includes additional information about moving picture data recorded on the recording medium, with moving picture data; and a controller searching for an additional information file linked with presently reproduced moving picture data based on the piece of link information stored in said data storage, and having contents of the found additional information file presented.

BRIEF DESCRIPTION OF THE DRAWINGS

The accompanying drawings, which are included to provide a further understandings of the invention, illustrate the preferred embodiments of the invention, and together with the description, serve to explain the principles of the present invention.

FIGS. 2 and 3 show structures of Video Manager Information (VMGI) and Video Title Set Information (VTSI), respectively, recorded in a navigation data zone of the recording medium of FIG. 1;

FIG. 4 shows hierarchically-structured digital data stream recorded on a recording medium;

FIG. 5 shows a part of program chain information including 4-byte-long PGC Content field a 'Script Flag' is allocated in;

FIG. 9 shows an embodiment of a method specifying that a moving picture data section has no related additional information;

DETAILED DESCRIPTION OF THE PREFERRED EMBODIMENT

In order that the invention may be fully understood, a preferred embodiment thereof will now be described with reference to the accompanying drawings.

Embodiments of a method linking additional information with moving picture data in accordance with the present invention are described first.

Figure 1:
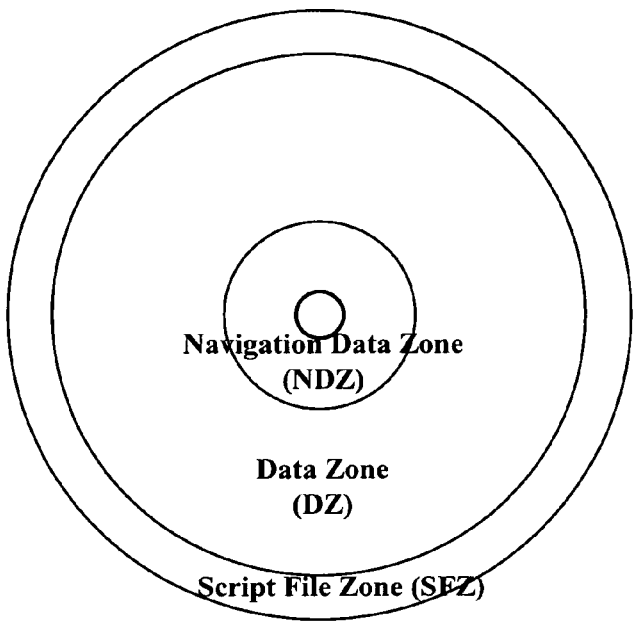
FIG. 1 schematically shows a recording medium such as a DVD including script files containing additional information about moving picture data.

FIG. 1 schematically shows a recording medium such as a DVD including script files containing additional information about moving picture data. The DVD of FIG. 1 is composed of three recording partitions, the first 'Data Zone (DZ)' for storing digital data stream such as moving picture data, the second 'Navigation Data Zone (NDZ)' for storing navigation data used to control reproduction of the stored digital data stream in the DZ, and the third 'Script File Zone (SFZ)' for storing script files having additional and/or detailed information about moving picture data.

In the SFZ, at least one link data file, which links script files with corresponding sections of moving picture data, may be included.

The additional information in the script file may be written in the conventional HTML (Hyper-Text Markup Language) format, and a single script file is linked with at least one a predetermined-sized VOBU (Video OBject Unit) which is defined in the general DVD recording standard.

In addition, the link data file may be created for each PGCI (ProGram Chain Information) which is also defined in the general DVD recording standard, and it is composed of link entries where each entry consists of a script file identifier and an address of VOBUs associated with a script file.

Figure 2:
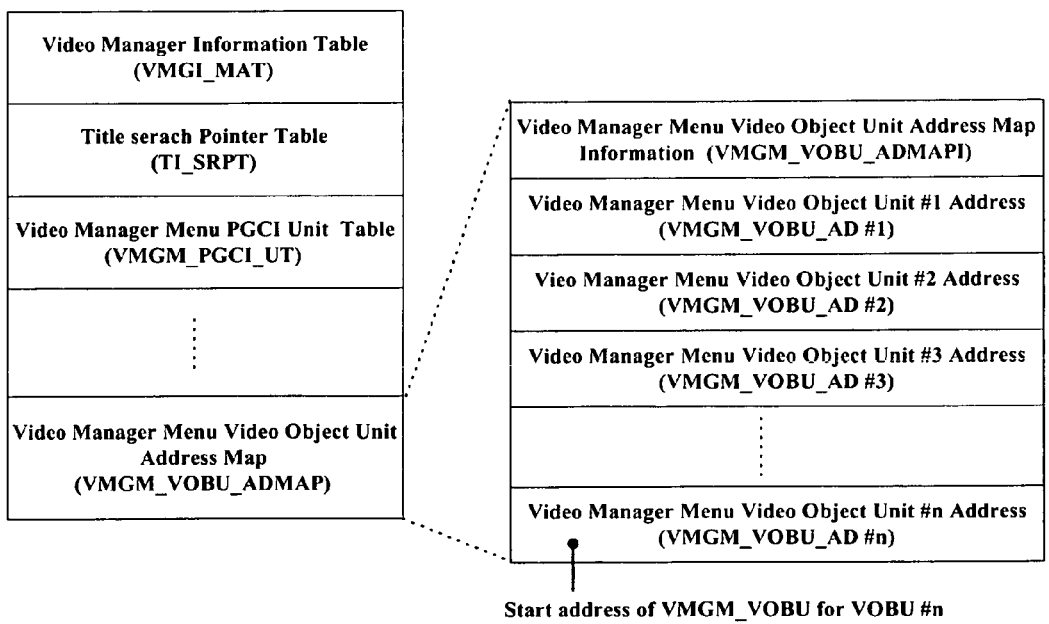

FIG. 2 shows the structure of Video Manager Information (VMGI) recorded in the NDZ. The VMGI includes Video Manager Menu VOBU Address Map 'VMGM_VOBU_AD-MAP' in which 4-byte-long start addresses of Video Manager Menu VOBUs 'VMGM_VOBU_Ads' are written.

FIG. 3 shows the structure of Video Title Set Information (VTSI) recorded in the NDZ. The VTSI includes Video Title Set Video Object Unit Address Map 'VTS_VOBU_ADMAP' in which 4-byte-long start addresses of Video Title Set VOBUs 'VTS_VOBU_Ads' are written.

FIG. 4 shows hierarchically-structured digital data stream recorded on a DVD. According to the hierarchical structure depicted in FIG. 4, single PGCI which has been written in the PGCI table included in the VMGI and/or VTSI is associated with at least one VOB (Video OBject), called program section or program chain, where a single VOB is composed of many VOBUs containing actual data.

In the PGCI, 4-byte-long PGC Content field is included as shown in FIG. 5. The PGC Content field consists of the following sub-fields: 8-bit-long 'Number of Cells', 7-bit-long 'Number of Programs', 1-bit 'Script Flag', and 16-bit-long 'Reserved'.

The 1-bit 'Script Flag' indicates whether or not script files are linked with an associated program chain. If the 'Script Flag' is set it means that there are linked script files, and if reset it means that there are not.

If there are linked script files, information for linking each script file with a corresponding section of moving picture data belonging to a program chain is stored in a link data file.

Figure 6:
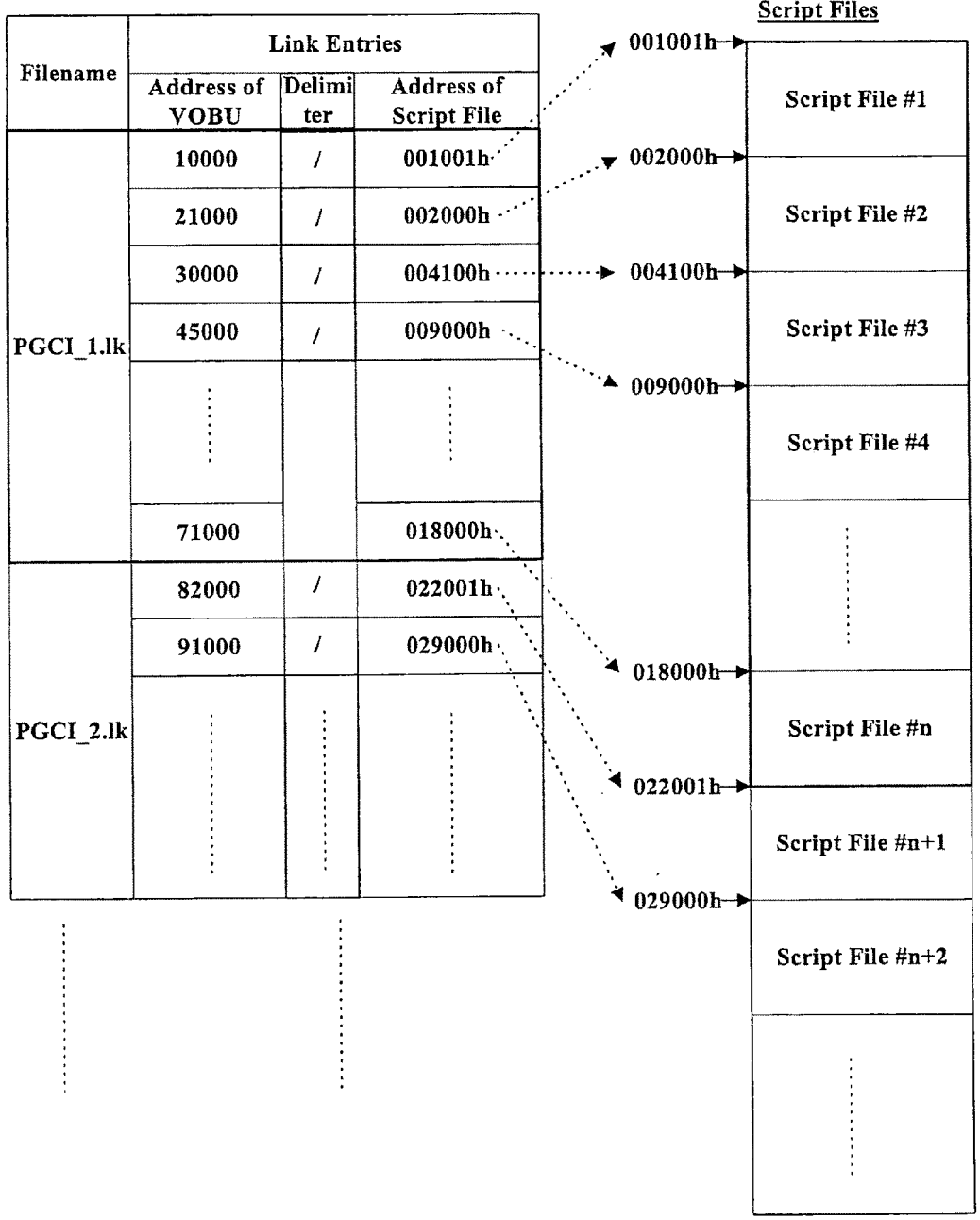
FIG. 6 shows the first embodiment of a method linking script files with moving picture data according to the present invention.

FIG. 6 shows an example of the structure of a link data file.

There may be several link data files, as shown in FIG. 6, to match one file with one program chain when a plurality of program chains exist on a DVD. Therefore, a link data file may have a filename indicative of an associated PGCI to distinguish what link data file is associated with what PGCI. For example, the first link data file associated with the PGCI 'PGCI #1' of the first program section is named to 'PGC_1.lk', and, in the same manner, the second link data file associated with the PGCI 'PGCI #2' of the second program section is named to 'PGC_2.lk' where the extension 'lk' implies link data file.

In the example of a link data file depicted in FIG. 6, each link entry written in the link data file consists of an address of a VOBU with which contents of a linked script file are to be presented and a recording address of the linked script file. For example, if it is supposed that an address of a VOBU with which contents of a linked script file are to be presented is '10000' and a recording address of the linked script file is '001001h', a corresponding link entry has data of '10000/001001h' where the symbol '/' is a delimiter. Other symbol such as a space may be used instead of '/'.

Figure 7:
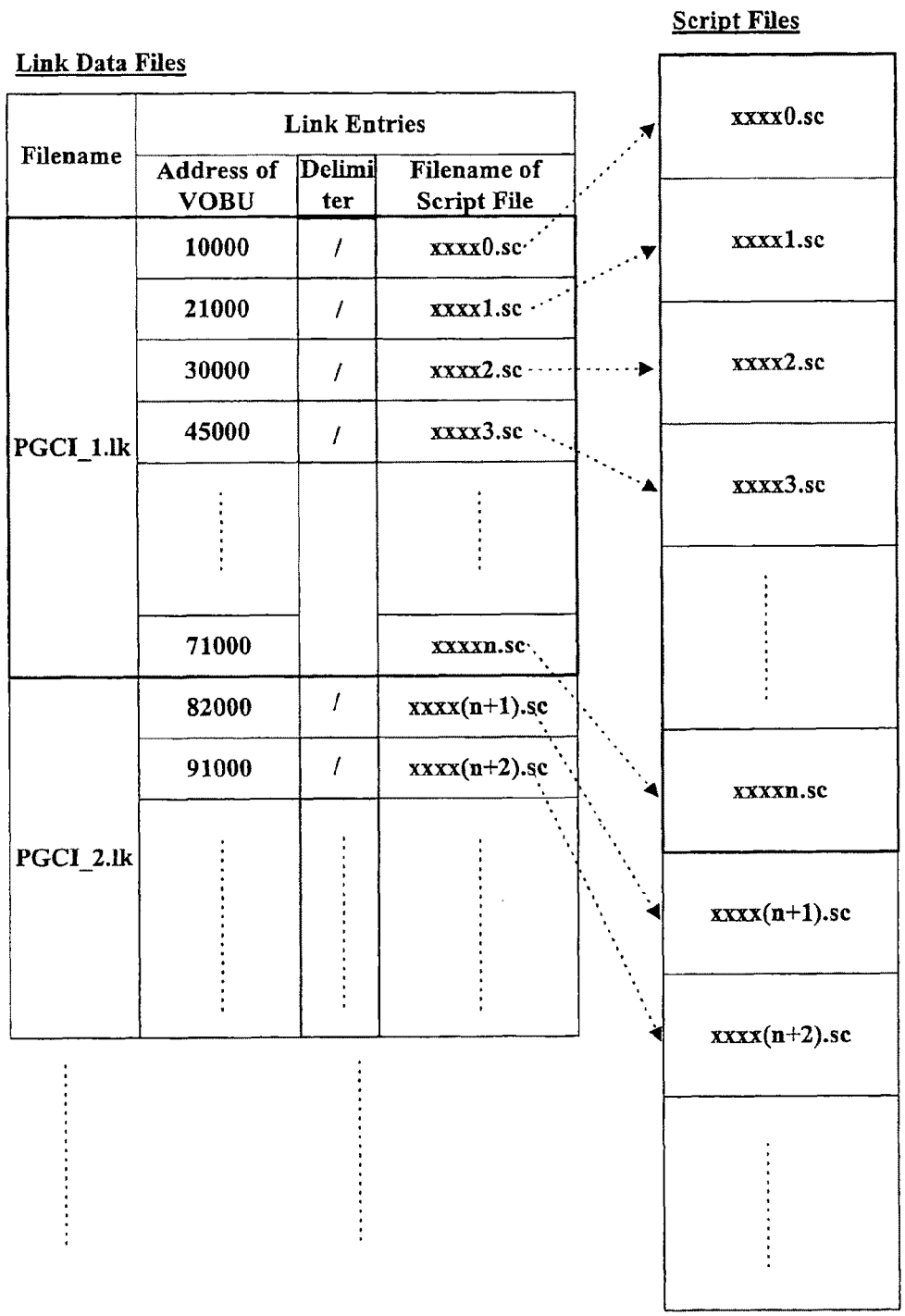
FIG. 7 shows the second embodiment of a method linking script files with moving picture data according to the present invention.

FIG. 7 shows another example of the structure of a link data file. In the example of FIG. 7, each link data file is associated with a corresponding program chain through a unique filename the same as the above example. Namely, a link data file is named to 'PGC_1.lk' for the first PGCI, and to 'PGC_2.lk' for the second PGCI. Each link entry consists of an address of a VOBU with which contents of a linked script file are to be presented and a filename of the linked script file. For example, if it is supposed that an address of a VOBU with which contents of a linked script file are to be presented is '10000' and a filename of the linked script file is 'xxxx0.sc', a corresponding link entry has data of '10000/xxxx0.sc' where the symbol '/' is a delimiter.

When a DVD including the above-explained script files and at least one link data file thereon is placed into a DVD player being able to the DVD and a program chain to reproduce is selected at the same time from a user, the DVD player checks the 1-bit 'Script Flag' written in the PGC Content field 'PGC_CNT' in PGCI of the selected program chain, first. If the 'Script Flag' is 1, the DVD player considers that script files associated with the selected program chain have been written in the SFZ, reads a data link file associated with the selected program chain from the SFZ, and stores the read data link file in a memory. In these successive operations, all script files in the SFZ may be read out and then stored in the memory along with the link data file.

Afterwards, the selected program chain is reproduced. If script display mode is activated, the DVD player examines all link entries in the link data file, stored in the memory, associated with the program chain being presented in order to search for an address which is equal to a start address of a VOBU being reproduced. If the same address is found in the link entries, the DVD player obtains a recording address or a filename of a script file combined with the found address through a delimiter '/', and decodes data contained in the identified script file by the obtained recording address or filename while reading the script file from the memory or the DVD. Through these operations, a viewer is able to view additional information related with the presented moving pictures at the same time while watching the moving pictures.

In the above embodiment, an additional link data file is necessary to link script files with moving picture data. However, script files can be linked directly with moving picture data without the above-explained link data file.

Figure 8:
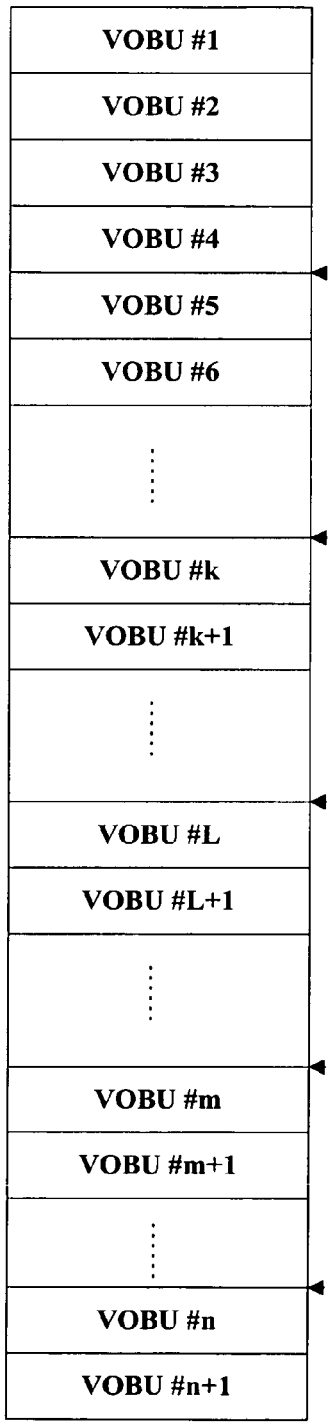
FIG. 8 shows the third embodiment of a method linking script files with moving picture data according to the present invention.

FIG. 8 is another embodiment of a method linking script files with moving picture data in accordance with the present invention.

In the embodiment of FIG. 8, every script file has filename including an address of a VOBU to be presented along with the script file. For example, if it is supposed that a script file is to be presented with the fifth VOBU 'VOBU #5' of which start address is '10000', the script file includes a string of '10000.sc' in its filename where the 'sc' means script file. In other words, a start address of a VOBU to be presented with additional information included in a script file must be used as a filename (extension excluded) of the script file, as shown in FIG. 8.

Therefore, a DVD player reads all script files written in the SFZ of a DVD and knows each start address of a VOBU to be presented with a script file based on each filename before starting reproduction. Afterwards, if there is a filename matched with an address of a VOBU being presented now, the DVD player reads data in a script file having the matched filename and decodes out them. Through these operations, a viewer can view additional information related with the presented moving pictures at the same time while watching the moving pictures.

Entire script files may be retrieved from a DVD and then stored in a memory at an initial disk loading process when a DVD is placed. Otherwise, linked script files are retrieved from a DVD and then decoded sequentially when a viewer activates script display mode. If a memory has enough storage capacity, it is preferable to respond to user's script display request after storing all script files in the memory.

An arbitrary section of moving picture data, namely several VOBUs may have no additional information although moving picture data have additional information overall. For such a section, a script file of which filename includes a start address of the section is still created, however, the script file has only null data. FIG. 9 shows this method schematically.

In the example of FIG. 9 illustrating a case that an arbitrary section of moving picture data is not supplied with additional information, a section from the L-th VOBU 'VOBU #L' to the (m−1)-th 'VOBU #m−1' has no additional information, so that a script file of which filename is '30000', same with the address of the L-th VOBU, has null data of fixed size.

Therefore, when the L-th VOBU is encountered while reproducing the moving picture data, the DVD player reads contents written in the script file '30000.sc' and it deletes previously-outputted contents of the script file '21000.sc' in a viewing screen because the contents of the file '30000.sc' are all null. As a result, while a section of moving picture data not supplied with additional information is being reproduced, previous additional information not related with current section disappears in a screen.

Instead of writing null data in a script file, a special code, e.g., '-' is added to the filename of a script file to indicate that a linked section has no additional information. For example, in the example of FIG. 9, the script file of which filename is same with the address of the L-th VOBU 'VOBU #L' is named to '-30000.sc'. Therefore, if a script file of which filename includes the code '-' is linked with current VOBU, a previously-presented script file is removed in a screen immediately without reading data in the script file.

An embodiment of method and apparatus of reproducing a recording medium including script files linked with moving picture data as explained above is now described in detail.

Figure 10:
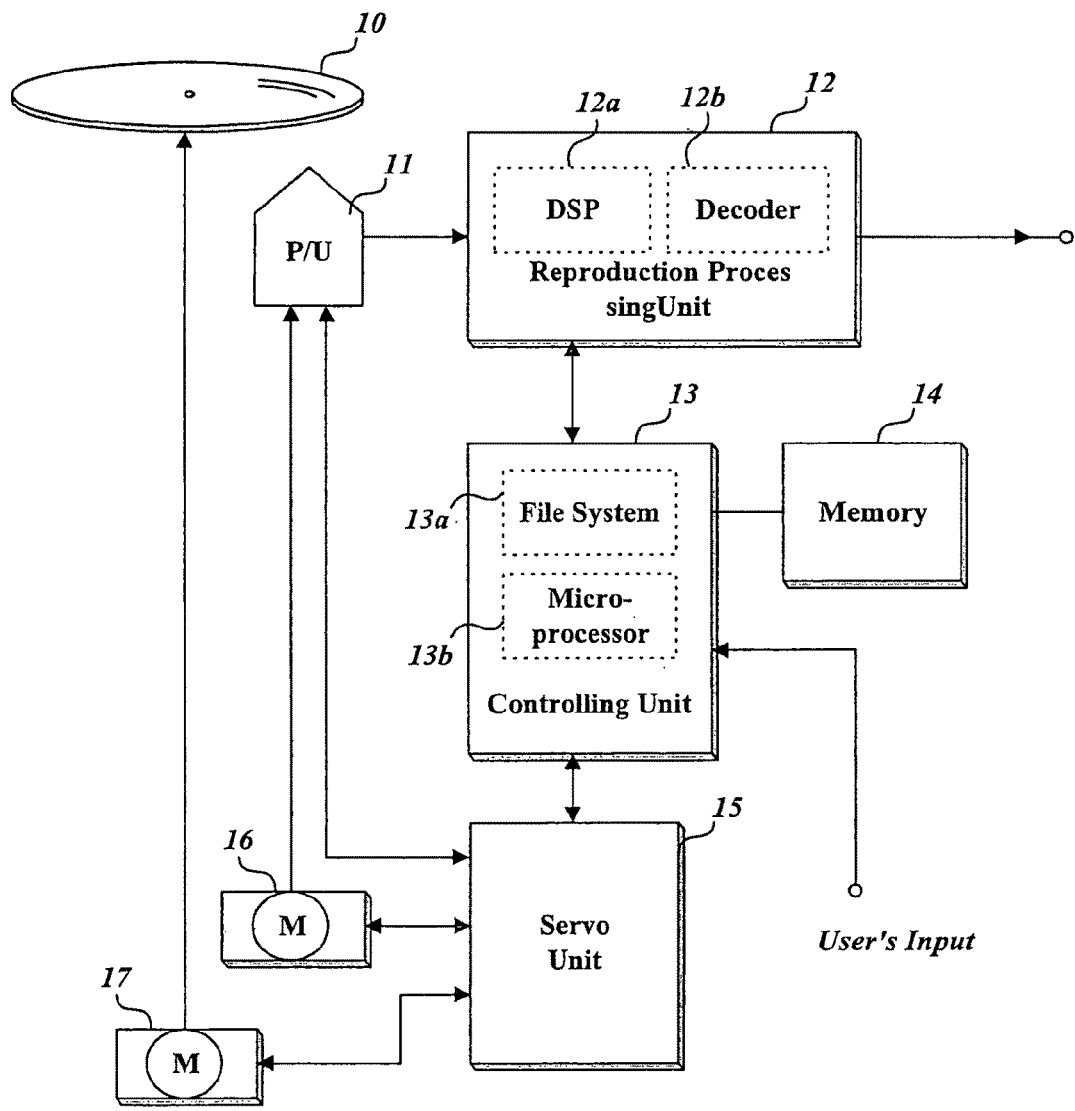
FIG. 10 is a block diagram of an apparatus reproducing a recording medium including script files as well as moving picture data in accordance with the present invention.

FIG. 10 is a block diagram of an apparatus reproducing a recording medium including script files as well as moving picture data in accordance with the present invention. The reproducing apparatus of FIG. 10 comprises an optical pickup 11 detecting signals recorded on a DVD 10 on which script files are also written; a reproduction processing unit 12 processing the detected signals by the pickup 11 to restore them to video, audio, and/or text data; a spindle motor 17 rotating the DVD 10; a sled motor 16 moving the pickup 11 inward and outward on the DVD 10; a servo unit 15 conducting servo operations for the spindle motor 17, the sled motor 16, and an objective lens of the pickup 11; a controlling unit 13 controlling all elements to reproduce the DVD 10; and a memory 14 for temporarily storing data produced while reproducing the DVD 10 and script files.

The reproduction processing unit 12 may be composed of a digital signal processor (DSP) 12a restoring the detected RF signals to digital data after converting the RF signals to binary signals, a decoder 12b decoding compressed digital data restored by the digital signal processor 12a, and the like. The controlling unit 13 may be composed of a file system 13a searching for and reading a link data file or a script file stored in the memory 14 or recorded on the DVD 10, a microprocessor 13b controlling reproduction of recorded data and script files in connection with the file system 13a, and so on. A reproduction operation, conducted under the control of the controlling unit 13, of both moving picture data and related additional information in script files is performed as follows.

Figure 11:
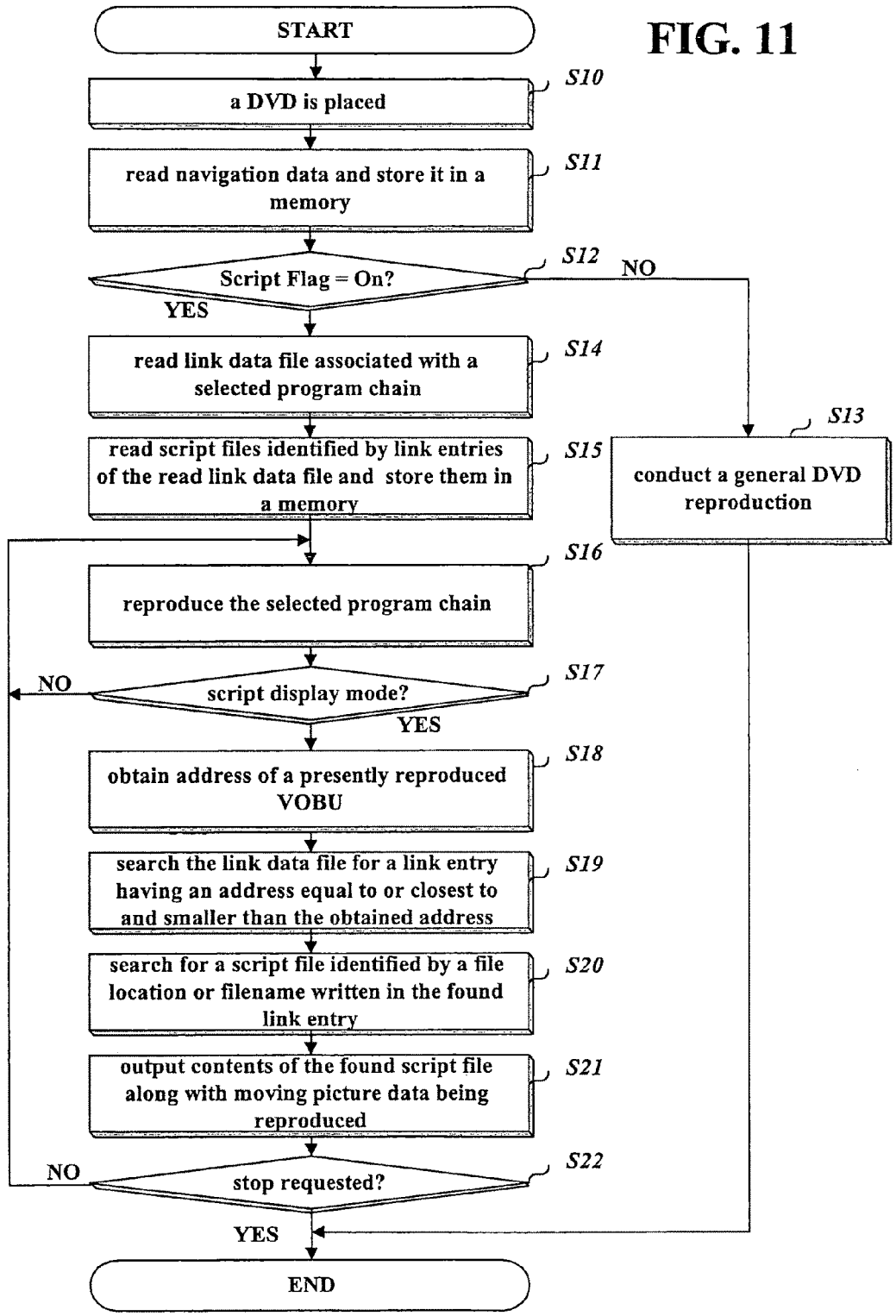
FIG. 11 is a flow chart of an embodiment of a method reproducing a recording medium including script files as well as moving picture data in accordance with the present invention.

FIG. 11 is a flow chart of an embodiment of a method reproducing a recording medium including script files as well as moving picture data in accordance with the present invention.

The procedures depicted in FIG. 11 are on the assumption that the DVD 10 includes a link data file in the SFZ as the embodiments of FIGS. 7 and 8. When the DVD 10 is placed exactly (S10), the controlling unit 13 reads navigation data for controlling reproduction of the DVD 10 from the NDZ and stores them in the memory 14, first (S11). There are the VMGI and the VTSI containing PGCI in the navigation data stored in the memory 14.

Because there may be several program chains on the DVD 10, the controlling unit 13 waits until a program chain is chosen to be reproduced by a user. If a program chain is selected, the controlling unit 13 checks 1-bit 'Script Flag' allocated in the PGC Content field 'PGC_CNT' written in PGCI associated with the chosen program chain (S12). If the value of 'Script Flag' is 0, the controlling unit 13 knows that there is no additional information associated with the chosen program chain, and conducts a general DVD reproducing operation (S13).

If the values of 'Script Flag' is 1, the controlling unit 13 considers that there is at least one stored script file, linked with the selected program chain, in the SFZ of the DVD 10, and it searches the SFZ of the DVD 10 for a link data file having filename associated with the PGCI of the chosen program chain. If found, the controlling unit 13 determines that the chosen program chain has linked script files, otherwise, it determines that the chosen program chain does not.

If it is determined that there is additional information related with the program chain, the controlling unit 13 reads out the found data link file from the SFZ (S14) and stores it in the memory 14. Specially, if storage of the memory 14 is large enough to store many script files, the controlling unit 13 analyzes all link entries of the stored link data file, reads every script file identified by address or filename written in each link entry, and stores the read script files in the memory 14, before starting to reproduce moving picture data belonging to the chosen program chain (S15).

Afterwards, the controlling unit 13 conducts reproducing operation of the selected program chain (S16). If current reproducing mode is script display one or if script display mode is requested from a user during reproduction of moving picture data (S17), the controlling unit 13 receives an address of a VOBU being reproduced now from the reproduction processing unit 12 or knows the address from the already-stored VTSI in the memory 14 (S18), and it searches the link data file stored in the memory 14 for a link entry of which VOBU address member is equal to the received or known address (S19). If the link entry is not found, the controlling unit 13 searches for a link entry of which VOBU address member is closest to and smaller than the received or known address (S19). If a link entry is found from the former or the latter search operation, the controlling unit 13 identifies a recording address or a filename of a script file from the other member, delimited by '/', of the found link entry, and searches the DVD 10 or the memory 14 for a script file identified by the address or filename through the file system 13a (S20).

Figure 12:
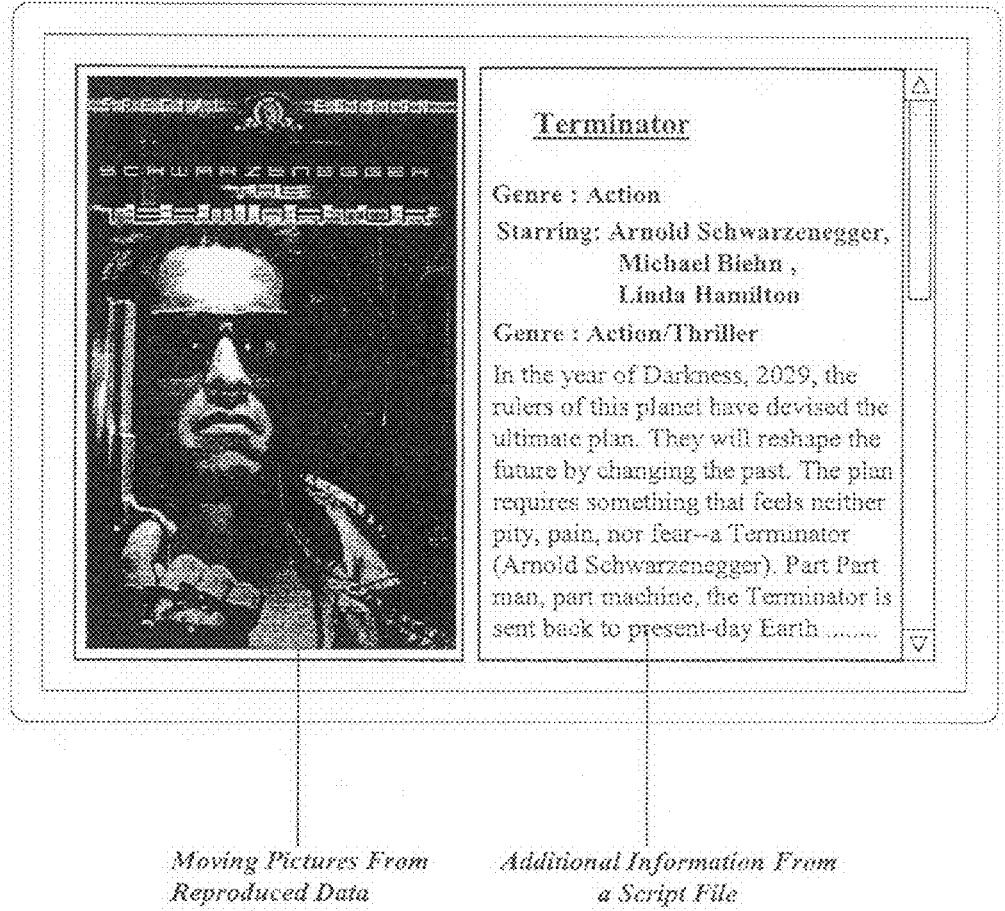
FIG. 12 shows an example of screen displaying both a scene by moving picture data and scene descriptive text by a script file.

If an associated script file is found, its contents are transmitted to the reproduction processing unit 12 which decodes the received contents in accordance with compressing way of the contents, if compressed, and outputs them along with video and audio data decoded from reproduced moving picture data (S21). Owing to this dual decoding and outputting operation, a scene by moving picture data and scene descriptive text by a script file are displayed together in a single screen as shown in FIG. 12.

In the meantime, if the found script file contains null data or has a special code such as '-' indicative of no linked additional information in its filename as explained referring to FIG. 9, the controlling unit 13 supplies the reproduction processing unit 12 with a signal indicative of no information to command the reproduction processing unit 12 to blank a present script window. Consequently, continuous display of previous script file is prevented.

Figure 13:
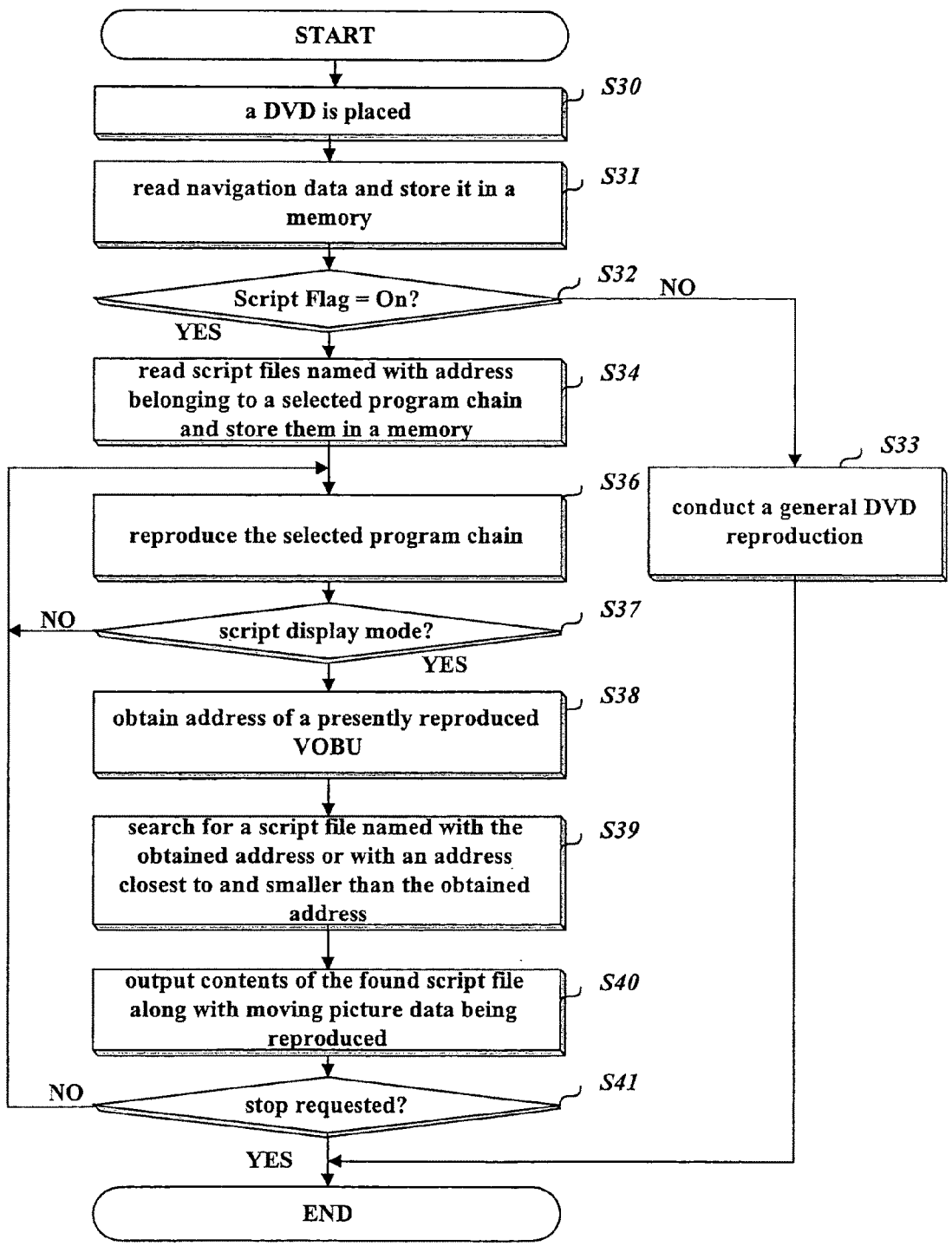
FIG. 13 is a flow chart of another embodiment of a method reproducing a recording medium including script files as well as moving picture data in accordance with the present invention.

FIG. 13 is a flow chart of another embodiment of a method reproducing a recording medium including script files as well as moving picture data in accordance with the present invention.

The procedures depicted in FIG. 13 are on the assumption that the DVD 10 includes no link data file as the embodiment of FIG. 9.

The procedures of the embodiment of FIG. 13 are totally same with those of FIG. 11 except the following distinctive steps. In the embodiment of FIG. 13, if it is determined that a selected program chain has additional information (S32), the address range of the selected program chain composed of at least one VOB is detected first and script files named with address belonging to the detected address range are all read from the SFZ of the DVD 10 into the memory 14 (S34).

Afterwards, if in script display mode, the controlling unit 13 receives an address of a VOBU being currently reproduced from the reproduction processing unit 12 or knows the address from the already-stored VTSI in the memory 14 (S38), and it searches the memory 14 for a script file named with the received or known address or with an address closest to and smaller than the received or known address (S39). If found, the controlling unit 13 transmits contents of the found script file to the reproduction processing unit 12 to be presented with reproduced moving pictures in a screen.

If the found script file contains only null data or has a special code indicative of no linked additional information in its filename, the controlling unit 13 supplies the reproduction processing unit 12 with a signal indicative of no information to blank a present script window as the former embodiment.

As shown in FIG. 12, the moving pictures and its related additional information may be displayed together through a conventional Web browser used for surfing Internet. In case of using Web browser, the script window for additional information can be scrolled to a previous or a next scene descriptive information by commands or clicks from a viewer. In addition, the descriptive data written in a script file may be made out in the form of hyper-text in order that a viewer might obtain with ease more detailed information related with a part of text, e.g., a word or a phrase by simply clicking it.

The above-explained method of linking additional information with each section of moving picture data and method and apparatus of reproducing a recording medium including the additional information as well as moving picture data make it possible for a viewer to obtain with ease additional and/or detailed information related to moving picture data reproduced from a recording medium such as a DVD.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of providing information for managing video data, comprising:
    providing management information for associating a metadata set with video data, wherein the management information includes link information that is used for retrieving the metadata set from a stream, wherein the metadata is a set of metadata, the metadata being used for describing the video data;
    providing a metadata indicator for indicating whether or not the metadata set exists in the stream including the management information,
    wherein the metadata indicator includes a plurality of indicator values, the plurality of indicator values including at least a first indicator value and a second indicator value, the first indicator value indicating that the metadata set associated with the video data does exist in the stream, the second indicator value indicating that the metadata set associated with the video data does not exist in the stream,
    wherein the metadata indicator is a flag, and
    wherein the metadata set is provided separately from the video data.

2. The method of claim 1, wherein the link information identifies at least one metadata set, the at least one metadata set including metadata associated with specific video data.

3. The method of claim 1, wherein the metadata includes one or more metadata units, the one or more metadata units being decoded at a specific time.

4. The method of claim 1, wherein the metadata set includes one or more metadata in a same format.

5. The method of claim 1, wherein a value of the flag can be 0 or 1.

6. An apparatus for providing information for managing video data comprising:
    a controller configured to,
        provide management information for associating a metadata set with video data, wherein the management information includes link information that is used for retrieving the metadata set from a stream, wherein the metadata is a set of metadata, the metadata being used for describing the video data; and
        provide a metadata indicator for indicating whether or not the metadata set exists in the stream including the management information,
    wherein the metadata indicator includes a plurality of indicator values, the plurality of indicator values including at least a first indicator value and a second indicator value, the first indicator value indicating that the metadata set associated with the video data exists in the stream, the second indicator value indicating that the metadata set associated with the video data does not exist in the stream,
    wherein the metadata indicator is a flag, and
    wherein the metadata set is provided separately from the video data.

7. The apparatus of claim 6, wherein the link information identifies at least one metadata set, the at least one metadata set including metadata associated with specific video data.

8. The apparatus of claim 6, wherein the metadata includes one or more metadata units, the one or more metadata units being decoded at a specific time.

9. The apparatus of claim 6, wherein the metadata set includes one or more metadata in a same format.

10. The apparatus of claim 6, wherein a value of the flag can be 0 or 1.

\* \* \* \* \*